US 8,789,180 B1

(12) United States Patent
Yang et al.

(10) Patent No.: US 8,789,180 B1
(45) Date of Patent: *Jul. 22, 2014

(54) MULTI-LAYERED APPLICATION CLASSIFICATION AND DECODING

(75) Inventors: Siying Yang, Burlingame, CA (US); Krishna Narayanaswamy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,183

(22) Filed: Feb. 6, 2012

Related U.S. Application Data

(63) Continuation of application No. 11/937,163, filed on Nov. 8, 2007, now Pat. No. 8,112,800.

(51) Int. Cl.
*G06F 12/14* (2006.01)

(52) U.S. Cl.
USPC .......................................................... 726/22

(58) Field of Classification Search
USPC .............................. 726/11, 13, 22, 23
See application file for complete search history.

(56) References Cited

U.S. PATENT DOCUMENTS

| 5,598,535 | A  | 1/1997  | Brech et al. |
| 5,884,025 | A  | 3/1999  | Baehr et al. |
| 5,960,452 | A  | 9/1999  | Chi |
| 6,147,976 | A  | 11/2000 | Shand et al. |
| 6,438,723 | B1 | 8/2002  | Kalliojarvi |
| 6,697,381 | B1 | 2/2004  | Talbot et al. |
| 6,826,694 | B1 | 11/2004 | Dutta et al. |
| 6,854,063 | B1 | 2/2005  | Qu et al. |
| 6,940,863 | B2 | 9/2005  | Xue et al. |
| 6,963,564 | B1 | 11/2005 | Liu |
| 6,973,055 | B1 | 12/2005 | Du |
| 7,454,792 | B2 | 11/2008 | Cantrell et al. |
| 7,463,590 | B2 | 12/2008 | Mualem et al. |
| 7,467,202 | B2 | 12/2008 | Savchuk |
| 7,496,962 | B2 | 2/2009  | Roelker et al. |
| 7,624,444 | B2 | 11/2009 | Gupta et al. |
| 7,725,558 | B2 | 5/2010  | Dickenson |
| 7,747,874 | B2 | 6/2010  | Goodwill et al. |
| 7,830,864 | B2 | 11/2010 | Li |
| 7,844,700 | B2 | 11/2010 | Marinescu et al. |
| 7,890,612 | B2 | 2/2011  | Todd et al. |

(Continued)

FOREIGN PATENT DOCUMENTS

CH 101056306 A 10/2007

OTHER PUBLICATIONS

U.S. Appl. No. 12/409,634, filed Mar. 24, 2009.
U.S. Appl. No. 11/835,923, filed Aug. 8, 2007.

(Continued)

*Primary Examiner* — Ellen Tran
(74) *Attorney, Agent, or Firm* — Shumaker & Sieffert, P.A.

(57) ABSTRACT

An intrusion detection system is described that is capable of applying a plurality of stacked (layered) application-layer decoders to extract encapsulated application-layer data from a tunneled packet flow produced by multiple applications operating at the application layer, or layer seven (L7), of a network stack. In this was, the IDS is capable of performing application identification and decoding even when one or more software applications utilize other software applications as for data transport to produce packet flow from a network device. The protocol decoders may be dynamically swapped, reused and stacked (layered) when applied to a given packet or packet flow.

34 Claims, 6 Drawing Sheets

(56) References Cited

U.S. PATENT DOCUMENTS

| | | |
|---|---|---|
| 7,950,059 B2 | 5/2011 | Aharon et al. |
| 7,995,584 B2 | 8/2011 | Eswaran et al. |
| 8,112,800 B1 | 2/2012 | Yang et al. |
| 8,166,554 B2 | 4/2012 | John |
| 8,228,926 B2 | 7/2012 | Miller et al. |
| 2002/0103953 A1 | 8/2002 | Das et al. |
| 2002/0144156 A1 | 10/2002 | Copeland, III |
| 2003/0105976 A1 | 6/2003 | Copeland, III |
| 2003/0149888 A1 | 8/2003 | Yadav |
| 2003/0154399 A1 | 8/2003 | Zuk et al. |
| 2004/0151206 A1 | 8/2004 | Scholte |
| 2004/0205360 A1 | 10/2004 | Norton et al. |
| 2004/0268149 A1 | 12/2004 | Aaron |
| 2005/0055399 A1 | 3/2005 | Savchuk |
| 2005/0243789 A1 | 11/2005 | Dinello et al. |
| 2005/0262560 A1 | 11/2005 | Gassoway |
| 2006/0101511 A1 | 5/2006 | Faillenot et al. |
| 2006/0114832 A1 | 6/2006 | Hamilton et al. |
| 2006/0123479 A1 | 6/2006 | Kumar et al. |
| 2006/0167915 A1 | 7/2006 | Furlong et al. |
| 2006/0168273 A1 | 7/2006 | Michael |
| 2006/0174337 A1 | 8/2006 | Bernoth |
| 2006/0259950 A1 | 11/2006 | Mattsson |
| 2006/0268932 A1 | 11/2006 | Singh et al. |
| 2006/0288418 A1 | 12/2006 | Yang |
| 2007/0005801 A1 * | 1/2007 | Kumar et al. .............. 709/238 |
| 2007/0192863 A1 | 8/2007 | Kapoor et al. |
| 2007/0230445 A1 | 10/2007 | Barrie et al. |
| 2008/0133518 A1 | 6/2008 | Kapoor et al. |
| 2009/0141729 A1 | 6/2009 | Fan |
| 2010/0085975 A1 | 4/2010 | Wang et al. |

OTHER PUBLICATIONS

Dreger et al., "Dynamic application-layer protocol analysis for network intrusion detection," Proceedings of the Usenix Security Symposium, Jul. 31, 2006 pp. 257-272.

Office Action from U.S. Appl. No. 12/409,634, dated Dec. 12, 2011, 55 pp.

Response to Office Action dated Dec. 12, 2011, from U.S. Appl. No. 12/409,634, filed Mar. 12, 2012, 38 pp.

Andrew Moore, "Internet traffic Classification using bayesian analysis techniques," Jun. 2005, ACM DL, vol. 33, Issue 1, pp. 53-60.

* cited by examiner

MULTI-LAYERED APPLICATION CLASSIFICATION AND DECODING

This application is a continuation of U.S. application Ser. No. 11/937,163, now U.S. Pat. No. 8,112,800, filed Nov. 8, 2007, the entire content of which is incorporated herein by reference

TECHNICAL FIELD

The invention relates to computer networks and, more particularly, to detection and prevention of attacks in computer networks.

BACKGROUND

A computer network typically includes a collection of interconnected computing devices that exchange data and share resources. The devices may include, for example, web servers, database servers, file servers, routers, printers, end-user computers and other devices. The variety of devices may execute a myriad of different services and communication protocols. Each of the different services and communication protocols exposes the network to different security vulnerabilities.

Conventional techniques for detecting network attacks use pattern matching. In particular, an intrusion detection system (IDS) device applies regular expressions or sub-string matches to detect defined patterns within a data stream. Multiple patterns may be used in an attempt to improve the accuracy of the attack detection. In order to improve the probability of detecting an attack, the IDS may attempt to identify the type of software application and protocol associated with the data stream. Based on the identification, the IDS selects the appropriate patterns to apply in order to detect a network attack, which is used herein to include viruses or other malicious activity.

Conventionally, many IDSs associate applications with a static port assignment and use these static port assignments to determine the type of application and protocol associated with a given data stream. Likewise, conventionally a single application operates at the application layer, or layer seven (L7), of the Open Systems Interconnection (OSI) networking model. However, certain software applications now employ dynamic or randomized port assignments rather than conforming to the static port assignments; for example, hacker toolkits may use dynamic port assignments in order to evade detection and containment. Moreover, certain L7 software applications, such as Kazaa™ and Yahoo!® Messenger, utilize other L7 protocols, such as the HyperText Transfer Protocol (HTTP), as transport applications; that is, multiple software applications may concurrently operate within L7 as a "stack" of software applications.

SUMMARY

In general, the invention is directed to techniques for detecting and preventing network attacks, such as buffer overflow attacks, network viruses or other malicious activity. More specifically, improved techniques are described herein for identifying the software application and protocol associated with a data stream processed by an intrusion detection system (IDS). For example, as described herein, an IDS capable of applying a plurality of stacked (layered) application-layer decoders to extract encapsulated application-layer data when multiple applications are operating at the application layer, or layer seven (L7), of a network. In this way, the IDS is capable of performing application identification and decoding even when one or more software applications utilize other software applications as for data transport.

Certain applications, such as Kazaa and Yahoo! Messenger (YMSG), may use another L7 application, such as the Hyper-Text Transfer Protocol (HTTP) or Microsoft's implementation of the Server Message Block (SMB) protocol, also known as the Common Internet File System (CIFS), as a transport layer-like application for transporting application data. The IDS may use various signatures to differentiate, for example, pure HTTP communications, Kazaa-HTTP communications, and YMSG-HTTP communications. The IDS may also use various signatures to detect an application operating over various transports, for example, Kazaa over TCP, Kazaa over UDP, or Kazaa over HTTP over TCP. Other examples include SMB over NETBIOS over TCP, MS AT Scheduler over Microsoft Remote Procedure Calls (MSRPC) over SMB over NETBIOS over TCP, MS AT Scheduler over MSRPC over TCP, MSRPC over SMB over NETBIOS over TCP/139, MSRPC over TCP/135, Microsoft Exchange Directory Service over MSRPC over dynamic TCP port, and Microsoft Workstation Service over MSRPC over SMB over NETBIOS over TCP/139.

In this manner, the corresponding packet flow may be viewed as a tunneled packet flow in which application data for one application is encapsulated within application data for a different software application. Upon detecting that one type of software application and application layer communication protocol is utilizing another type of software application and application-layer communication protocol as a transport mechanism, the IDS selects an appropriate stack of protocol decoders to decode the tunneled packet flow.

The IDS may continue to analyze the identity of applications over a communication stream even after the IDS has positively identified one application. Multiple applications may operate within a single application-layer data stream. For example, a single HTTP stream could include pure HTTP data, Kazaa data, and YMSG data. Thus the IDS may continuously monitor the HTTP stream to determine the applications operating over that HTTP stream. The IDS may divide a data stream, such as an HTTP data stream, into a sequence of blocks and attempt to identify an application associated with each block. The IDS may also apply attack signatures to each block to determine whether the block represents malicious data. The IDS may select the attack signatures in accordance with the identification of the application, as various applications may have unique vulnerabilities.

In one embodiment, a method comprises receiving, with a network device, a packet flow within a network. The method further comprises performing an initial analysis of the packet flow to identify of a first type of software application and application-layer communication protocol associated with the packet flow, and determining whether a second type of software application and application-layer communication protocol is using the first type of software application and application-layer communication protocol as a data transport. When the second type of software application and application-layer communication protocol is using the first type of software application and application-layer communication protocol as a data transport, a subsequent analysis of the packet flow is performed to identify the second type of software application and application-layer communication protocol. A plurality of application-layer decoders are then applied to extract application-layer data for the identified second type of software application encapsulated within the application-layer data associated with the first type of software application. A set of one or more patterns is applied to the extracted application-layer data to determine whether the packet flow represents a network attack. The packet flow is forwarded when the packet flow does not represent a network attack.

In another embodiment, an intrusion detection system includes a flow analysis module to receive a packet flow, a forwarding component to transmit the packet flow, an application identification module, a plurality of protocol decoders, and a stateful inspection engine. The application identification module is configured to: (i) perform an initial identification of a first type of software application and application-layer communication protocol associated with the packet flow, (ii) to perform a subsequent identification of a second type of software application and application-layer communication protocol, and (iii) to determine whether the second type of application-layer software application and communication protocol is using the first type of application-layer software application and communication protocol as a data transport. The plurality of protocol decoders include a first protocol decoder that is applied to the packet flow to extract first application-layer data for the identified first type of software application and application-layer communication protocol. A second protocol decoder is applied to the first application-layer data to extract second application-layer data for the second type of software application and application-layer communication protocol. The stateful inspection engine applies one or more sets of patterns to the first application-layer data and the second application-layer data to determine whether the packet flow represents a network attack.

In another embodiment, a computer-readable medium contains instructions to perform the functions described herein. The computer-readable medium may be a computer-readable storage medium, such as a hard disk, random access memory (RAM), read only memory (ROM), programmable ROM (PROM), erasable PROM (EPROM), electronically erasable PROM (EEPROM), flash memory, a compact disc read-only media (CD-ROM), flash memory, or other suitable storage medium. The instructions cause a processor to receive, with a network device, a packet flow within a network, perform an initial analysis of the packet flow to identify of a first type of software application and application-layer communication protocol associated with the packet flow, determine whether a second type of software application and application-layer communication protocol is using the first type of software application and application-layer communication protocol as a data transport, apply a plurality of different decoders to the packet flow to extract from the packet flow application-layer data for the identified second type of software application and application-layer communication protocol that is encapsulated within application-layer data associated with the first type of software application and application-layer communication protocol, and apply a set of patterns to the extracted application-layer data to determine whether the packet flow represents a network attack.

The techniques described herein may provide several advantages. For example, the techniques described herein may improve the efficiency and accuracy of identification of applications in order to effect intrusion detection and/or intrusion prevention. Likewise, detection of applications that use various means for transporting communications may become possible. For example, the techniques may enable detection of layered software applications at the application layer (L7) of a network. Moreover, the techniques may be applied without radically changing certain IDSs. For example, in some cases, the techniques may be applied by merely updating the software of an IDS without changing the associated hardware. As another example, the techniques may identify malicious packet flows more quickly by identifying the type of application and protocol and tailoring signatures to fit the protocol(s) of that application. Moreover, other systems or devices that identify applications may use the techniques described herein, such as an intrusion prevention system (IPS).

The details of one or more embodiments of the invention are set forth in the accompanying drawings and the description below. Other features, objects, and advantages of the invention will be apparent from the description and drawings, and from the claims.

DETAILED DESCRIPTION

Figure 1:
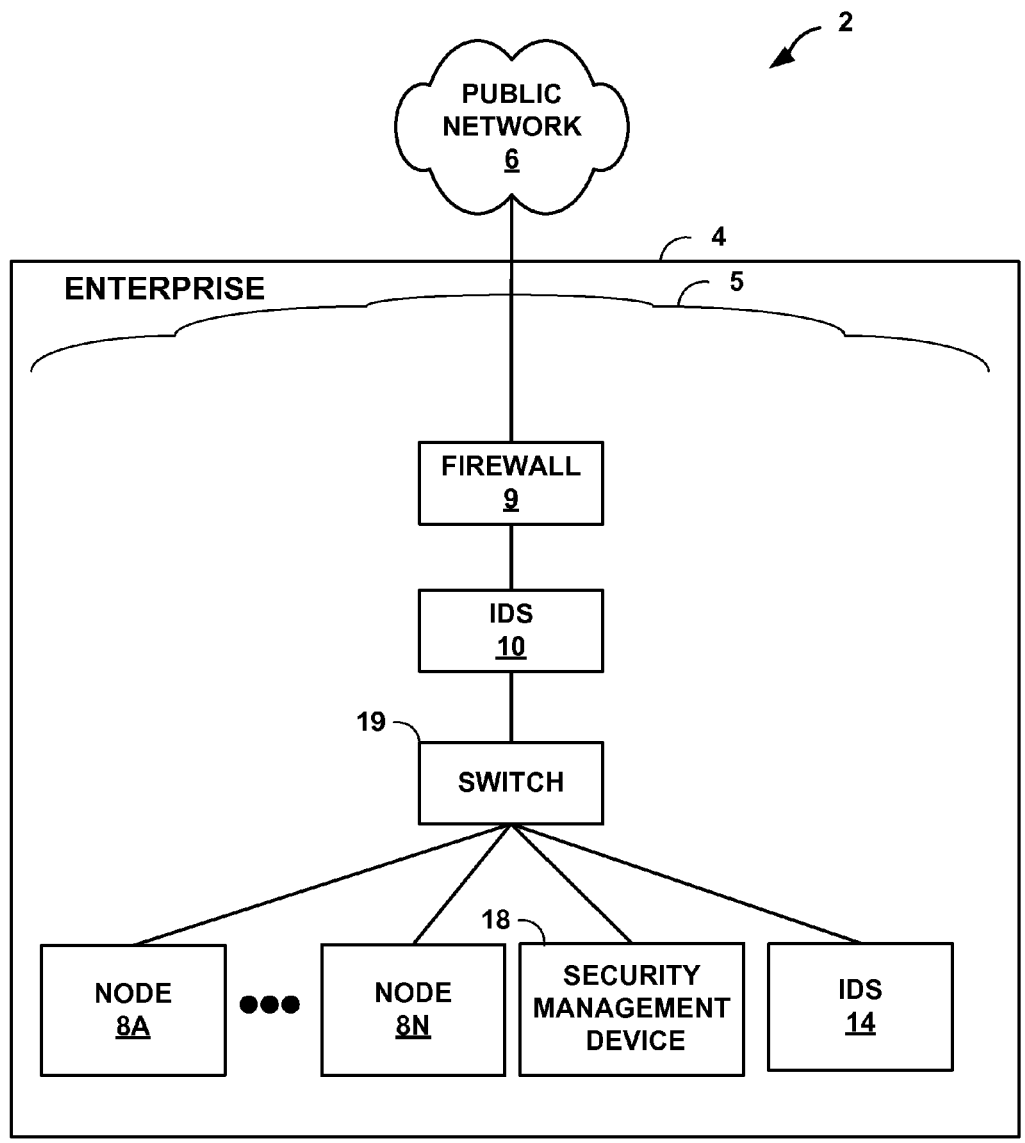
FIG. 1 is a block diagram illustrating an exemplary enterprise computer network in which an intrusion detection system (IDS) identifies applications and protocols in accordance with the principles of the invention.

FIG. 1 is a block diagram illustrating an exemplary enterprise computer network in which an intrusion detection system (IDS) 10 identifies applications and protocols in accordance with the principles of the invention. In the example embodiment of FIG. 1, IDS 10 is a single network device. In other embodiments, a device or system may perform substantially similar functions to an IDS, and may be included in another device or system. For example, in one embodiment, one component of an intrusion prevention system (IPS) may perform similar functions to IDS 10 as part of intrusion prevention. Network 4 also includes a private enterprise computing network 5 that is coupled to public network 6, such as the Internet. Public network 6 may include, for example, one or more client computing devices. Firewall 9 protects enterprise network 5 and, in particular, internal computing nodes 8A-8N (computing nodes 8). Computing nodes 8 represent any private computing device within enterprise network 5, for example, workstations, file servers, print servers, database servers, printers, and other devices.

In the example of FIG. 1, enterprise network 5 includes IDS 10 that monitors traffic flowing between firewall 9 and internal computing nodes 8. As described herein, IDS 10 may attempt to determine whether a particular network communication represents a network attack. To do so more effectively, IDS 10 may first attempt to identify an application associated with the network communication. By identifying the application, IDS 10 may efficiently determine the scope of analysis to use in making the determination of whether the communication represents an attack.

In accordance with the principles of the invention, IDS 10 integrates pattern matching with application- and protocol-specific anomaly detection to identify sophisticated attack behaviors. In one embodiment, IDS 10 allows the system administrator to specify attack definitions. In one embodiment, the system administrator may specify compound attack definitions. Further details on application of attack definitions, e.g. compound attack definitions, may be found within U.S. patent application Ser. No. 11/045,572, Guruswamy et al., "Compound Attack Detection in a Computer Network," filed Jan. 27, 2005, assigned to the assignee of the current application, which is incorporated herein by reference in its entirety.

In general, the attack definitions may specify, for example, any combination of textual and non-textual (e.g., binary) patterns and protocol anomalies to define complex attack signatures. Moreover, IDS 10 may associate particular signatures with protocols of certain applications. For a given communication session intercepted by IDS 10, the IDS attempts to identify the application type and underlying protocol for the packet flows of the session in order to select one or more attack signatures to apply to the packet flows.

In general, IDS 10 identifies packet flows in the monitored traffic, and transparently reassembles application-layer communications from the packet flows. A set of protocol-specific decoders within the IDS 10 analyzes the application-layer communications and identifies application-layer transactions. In general, a "transaction" refers to a bounded series of related application-layer communications between peer devices. For example, a single TCP connection can be used to send (receive) multiple HyperText Transfer Protocol (HTTP) requests (responses). As one example, a single web-page comprising multiple images and links to HTML pages may be fetched using a single TCP connection. An HTTP decoder identifies each request/response within the TCP connection as a different transaction. This may be useful to prevent certain attack definitions from being applied across transaction boundaries. In one embodiment, a transaction may be identified according to source and destination IP address, protocol, and source and destination port numbers. Other embodiments may identify a transaction in other ways, for example, by using media access control (MAC) addresses.

For each transaction, the corresponding decoder analyzes the application-layer communications and extracts protocol-specific elements. For example, for an FTP login transaction, the FTP decoder may extract a pattern corresponding to a user name, a name for the target device, a name for the client device, or other information. Because a single packet flow may have multiple associated applications, IDS 10 may switch decoders on the fly. That is, one decoder may be analyzing the packet flow, but IDS 10 may transfer control to a different decoder in response to a change in the application.

In addition, the decoders analyze the application-layer communications associated with each transaction to determine whether the communications contain any protocol-specific "anomalies." In general, a protocol anomaly refers to any detected irregularity within an application-layer communication that does not comply with generally accepted rules of communication for a particular protocol. The rules may, for example, be defined by published standards as well as vendor-defined specifications. Other anomalies refer to protocol events (i.e., actions) that technically comply with protocol rules but that may warrant a heightened level of scrutiny.

One example of such a protocol event is repeated failure of an FTP login request. Example anomalies for the HTTP protocol include missing HTTP version information, malformed universal resource locators (URLs), directory traversals, header overflow, authentication overflow and cookie overflow. Example anomalies for SMTP protocol include too many recipients, relay attempts, and domain names that exceed a defined length. Example anomalies for the POP3 protocol include user overflow and failed logins. Example anomalies for the FTP protocol include missing arguments, usernames or pathnames that exceed a defined length and failed logins. Other anomalies include abnormal and out-of-specification data transmissions, and commands directing devices to open network connections to devices other than the client devices issuing the commands.

IDS 10 applies the attack definitions to the elements and the protocol-specific anomalies identified by the protocol decoders to detect and prevent network attacks. For example, a system administrator may specify a compound network attack that includes the protocol anomaly of repeated FTP login failure and a pattern that matches a login username of "root." In this manner, the system administrator may combine pattern analysis with protocol anomalies to define complex attack definitions. In the event of a network attack, IDS 10 may take one or more programmed actions, such as automatically dropping packet flows associated with the application-layer communications within which the network attack was detected.

IDS 10 may provide several advantages. For example, IDS 10 may efficiently and accurately identify applications in order to effect intrusion detection and/or intrusion prevention. Likewise, IDS 10 may detect applications that use various means for transporting communications, e.g., either using layer four (L4), or the transport layer, as a transport means, or using another software application at layer seven (L7), or the application layer, as a transport means. That is, IDS 10 may detect layered or stacked applications at L7 of a network. Moreover, in some cases the techniques may be applied by extending the functionality of an existing IDS. For example, in some cases, the techniques may be applied by updating the software, firmware, or by making adjustments to an existing IDS in accordance with the techniques described herein. The techniques may advantageously identify malicious packet flows quickly and efficiently by identifying the type of application and protocol associated with the packet flow, even when one or more underlying upper-level (e.g., L7) applications are used as transports for additional applications. Signatures can then be tailored to fit the protocol(s) of the identified application(s).

Figure 2:
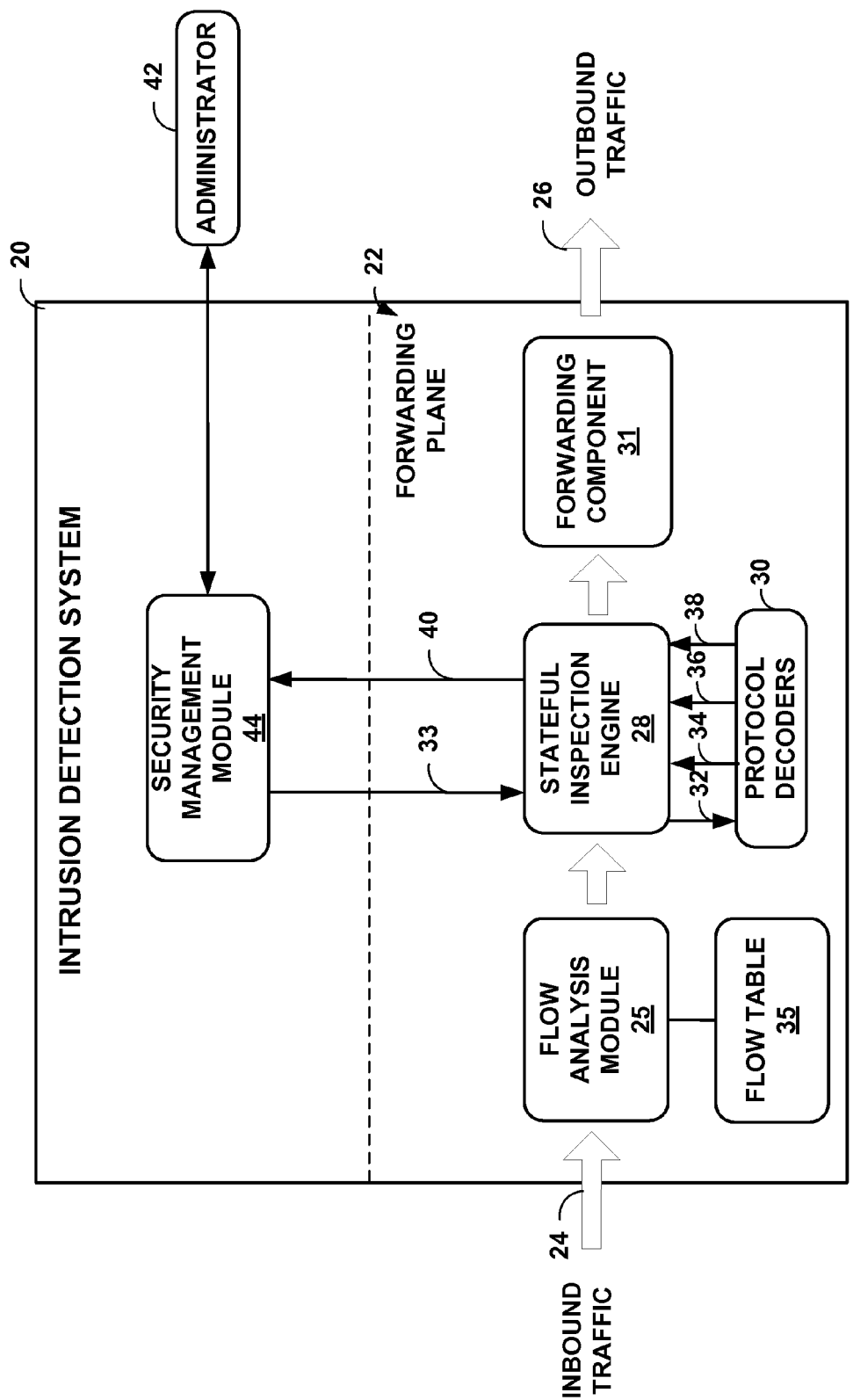
FIG. 2 is a block diagram illustrating an example embodiment of an IDS.

FIG. 2 is a block diagram illustrating an example embodiment of an IDS 20. In the illustrated example, IDS 20 includes a forwarding plane 22 that transparently monitors inbound network traffic 24 and forwards the network traffic as outbound network traffic 26. In the example illustrated by FIG. 2, forwarding plane 22 includes flow analysis module 25, stateful inspection engine 28, a plurality of protocol decoders 30, forwarding component 31 and security management module 44. The exemplary embodiment of IDS 20 of FIG. 2 illustrates IDS 20 as a single network device, such as IDS 10 or 14 of FIG. 1. Other embodiments may include the functionality of IDS 20 in multiple network devices or in other types of devices, such as security management device 18, switch 19, or firewall 9 of FIG. 1.

Security management module 44 presents a user interface by which administrator 42 configures IDS 20. For example, administrator 42 may configure IDS 20 to monitor particular subnets of the enterprise network. In addition, security management module 44 presents a user interface by which administrator 42 may specify attack definitions 33, which security management module 44 relays to stateful inspection engine 28. In one embodiment, attack definitions 33 may be compound attack definitions. Moreover, security management module 44 may present a user interface by which administrator 42 may modify assumptions regarding packet flow characteristics, such as the highest priority packet flows for monitoring, port bindings for applications, or other features of determining a type of application and protocol associated with the packet flow. Security management module 44 may also present a user interface by which administrator 42 may create, load, update, modify, retrieve, or store an application tree, such as application tree 70 of FIG. 4.

Flow analysis module 25 receives inbound traffic 24 and identifies network flows within the traffic. Each network flow represents a flow of packets in one direction within the network traffic and is identified by at least a source address, a destination address and a communication protocol. Flow analysis module 25 may utilize additional information to specify network flows, including source media access control (MAC) address, destination MAC address, source port, and destination port. Other embodiments may use other information to identify network flows, such as IP addresses.

Flow analysis module 25 maintains data within flow table 35 that describes each active packet flow present within the network traffic. Flow table 35 specifies network elements associated with each active packet flow, i.e., low-level information such as source and destination devices and ports associated with the packet flow. In addition, flow table 35 may identify pairs of packet flows that collectively form a single communication session between a client and server. For example, flow table 35 may designate communication session as pairs of packet flows in opposite directions for flows sharing at least some common network addresses, ports and protocol.

As described in further detail below, stateful inspection engine 28 inspects packet flows to determine the identity of an application associated with the packet flow. Stateful inspection engine 28 may further determine whether a single application is associated with the packet flow, or whether an application is using another application as a transport. Specifically, stateful inspection engine 28 analyzes the packet flow in an attempt to identify each application in an application stack at L7 that originally produced the packet flow.

IDS 20 may use a minimum data size of the reassembled TCP segments, in addition to the signature, in order to identify the types of applications. Certain applications may require a minimum amount of data, so IDS 20 may distinguish malicious packet flows by determining whether the packet flow contains enough data for the identified protocol. Moreover, IDS 20 may not necessarily recognize every application. In one embodiment, when an application is unknown, IDS 20 may simply forward the packet flow. If IDS 20 cannot identify a given application, it may be because that application is not a typical target for a malicious packet flow. Other embodiments may take other actions for unidentified applications, however, such as discarding all packets which target unknown applications or applying a default signature to all packet flows associated with unknown application types. Other embodiments may also utilize other protocols, such as the user datagram protocol (UDP); IDS 20 accordingly may require a minimum data size of UDP segments in order to identify the application associated with the UDP segments.

In one embodiment, stateful inspection engine 28 may include a co-processor to perform application identification. The co-processor may continually receive input in the form of the packet flow and may constantly perform application identification on the packet flow. For each chunk of the packet flow, the co-processor may return the identity or identities the application(s) that the co-processor identified.

For each packet flow, stateful inspection engine 28 may buffer a copy of the packet flow and may reassemble the buffered packet flow to form application-layer communications 32. For example, stateful inspection engine 28 may reconstruct TCP segments into application-layer communications 32, which represent protocol-specific messages. In one embodiment, stateful inspection engine 28 may buffer only a certain portion of the packet flow, such as a certain number of bytes, e.g. 400 bytes of the packet flow.

Stateful inspection engine 28 invokes one or more of protocol decoders 30 to analyze the application-layer communications 32 based on the identified type of applications identified for the packet flow. For example, stateful inspection engine 28 may select a single one of protocol decoders 30 in the event the stateful inspection engine determines that the packet flow originated from a single application-layer software application that relied exclusively on layer 4 transport for the application-layer data. As another example, stateful inspection engine 28 may select and apply multiple protocol decoders in the event it determines that the packet flow originate from multiple stacked application-layer software applications, i.e., that at least one application-layer software application is using another application-layer software application as a transport for its application-layer data. In this situation, stateful inspection engine 28 may construct a stack of protocol decoders for layered processing and decoding of the packet flow.

In general, protocol decoders 30 include a set of one or more protocol-specific software modules that process application-layer communications 32 and output transaction data 34 that identifies application-layer transactions. In particular, transaction data 34 indicate when a series of related application-layer communications between two peer devices start and end. In one embodiment, one or more of protocol decoders 30 may be generic protocol decoders, such that the generic protocol decoders attempt to identify the application corresponding to the payload of an application-layer communication 32. An example of a generic protocol decoder is an algorithm that matches a predefined set of application fingerprints/signatures to the data being decoded and identifies the application based on a particular fingerprint match. For example, a generic protocol decoder may attempt to identify the application corresponding to the payload of an HTTP communication.

Many of protocol decoders 30 correspond to a different communication protocol or service. Examples of communication protocols that may be supported by protocol decoders 30 include the HyperText Transfer Protocol (HTTP), the File Transfer Protocol (FTP), the Network News Transfer Protocol (NNTP), the Simple Mail Transfer Protocol (SMTP), Telnet, Domain Name System (DNS), Gopher, Finger, the Post Office Protocol (POP), the Secure Socket Layer (SSL) protocol, the Lightweight Directory Access Protocol (LDAP), Secure Shell (SSH), Server Message Block (SMB) and other protocols.

In addition, some or all of protocol decoders 30 may be specific for decoding encapsulated application-layer data carried by other application-layer protocols. For example, protocol decoders 30 may include both a protocol decoder for decoding application data for Yahoo Messenger (an L7 application) running over TCP/IP (L4 transport), and a protocol decoder for decoding application data for Yahoo Messenger running over HTTP (another L7) protocol. In a second example, stateful inspection engine 28 may construct a stack of protocol decoders 30 including an HTTP protocol decoder and a Yahoo! Messenger running over an HTTP protocol decoder for processing the packet flow.

As another illustration, the techniques may be applied to a data stream associated with a network system employing Web Services and Service Oriented Architecture (SOA). For example, a sales application implementing Web Services and conforming to a SOA may embed a plurality of different requests in one or more HTTP requests or a common data stream. For example, the sales application may embed a request for data from an Oracle database in an HTTP message, as well as a request for weather data from a weather information service. Accordingly, protocol decoders 30 may include a protocol decoder for decoding application data for Oracle requests over HTTP and another protocol decoder for weather data requests over HTTP.

In one embodiment, each of protocol decoders 30 receives data via a universal software interface, i.e., a software interface that processes application data in a manner that is independent from the underlying transport mechanism. In this way, protocol decoders may be swapped, reused and stacked (layered) when applied to a given packet flow.

This layered infrastructure provided by stateful inspection engine 28 and protocol decoders 30 may be advantageous. For example, traditionally, IDSs have received packet flows that have been bound to transport protocols, such as TCP or UDP, operating at the transport layer, or layer four (L4), of the network. Consequently, a conventional IDS may make the assumption that data transport occurs at L4 of the network. As described herein, stateful inspection engine 28 does not make such assumption and is able to identify and decode applications that are not bound to transporting data over L4. For example, HTTP may operate over port 80 of TCP, port 8080 of TCP, or may dynamically request a port. Other programs may operate over HTTP in an application stack. Consequently, the universal interface presented by decoders 30 receives application data without making an assumption as to the transport means used by the data stream. The universal interface may receive data, for example, as pure application layer, or L7, data with underlying headers and formatting being previously removed. This allows protocol decoders to be applied to a given packet flow or an individual packet in a layered manner. This may be advantageous given that certain L7 software applications, such as Kazaa and Yahoo! Messenger (YMSG), may use another L7 application, such as the HyperText Transfer Protocol (HTTP) or Microsoft's implementation of the Server Message Block (SMB) protocol, also known as the Common Internet File System (CIFS), as a transport layer-like application for transporting application data. The IDS may use various signatures to differentiate, for example, pure HTTP communications, Kazaa-HTTP communications, and YMSG-HTTP communications. The IDS may also use various signatures to detect an application operating over various transports, for example, Kazaa over TCP, Kazaa over UDP, or Kazaa over HTTP. In this manner, the corresponding packet flow may be viewed as a tunneled packet flow in which application data for one application is encapsulated within application data for a different software application.

After application of protocol decoders 30 to a given packet flow or individual packet, the protocol decoders return transaction data 34, application-layer elements 36 and protocol anomaly data 38 to stateful inspection engine 28. Stateful inspection engine 28 applies attack definitions 33 to protocol-specific application-layer elements 36 and anomaly data 38 to detect and prevent network attacks and other security risks.

In the event a security risk is detected, stateful inspection engine 28 outputs alert 40 to security management module 44 for logging and further analysis. In addition, stateful inspection engine 28 may take additional action, such as dropping the packets associated with the communication session, automatically closing the communication session or other action. If no security risk is detected for a given application-layer communication session, forwarding component 31 continues to forward the packet flows between the peers. Forwarding component 31 may, for example, maintain a routing table that stores routes in accordance with a topology of the enterprise network for use in forwarding the packet flows.

Figure 3:
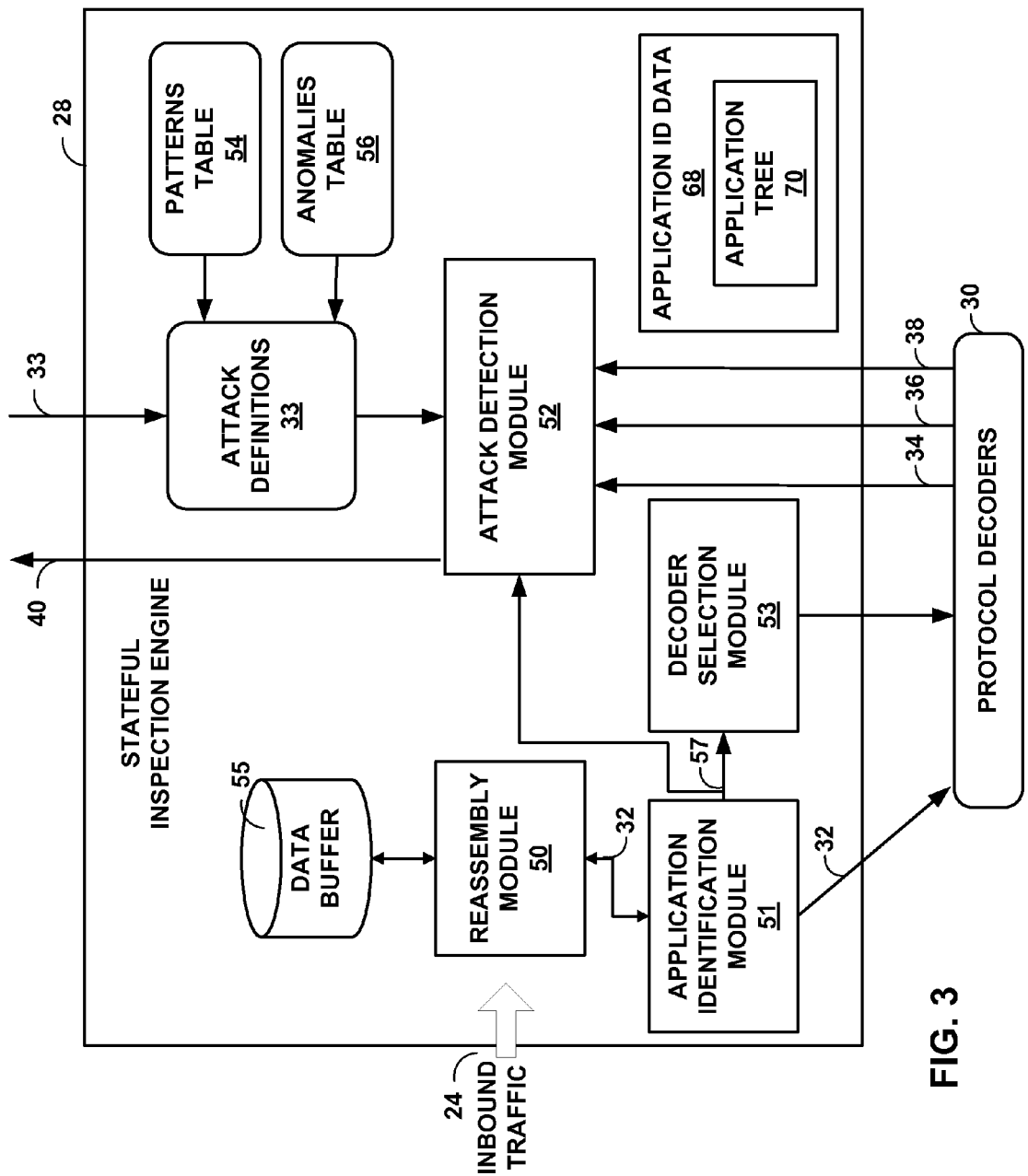
FIG. 3 is a block diagram illustrating an example embodiment of a stateful inspection engine of an IDS.

FIG. 3 is a block diagram illustrating an example embodiment of stateful inspection engine 28 of IDS 20. In the example embodiment, stateful inspection engine 28 includes reassembly module 50, application identification module 51, protocol selection module 53, and attack detection module 52. In addition, stateful inspection engine 28 includes patterns table 54, data buffer 55, anomalies table 56, attack definitions 33, and application identification data 68.

Reassembly module 50 receives inbound network traffic 24 and reassembles application-layer communications 32 from the packet flows by removing any underlying transport information (e.g., L4 information and below). In general, reassembly module 50 forwards the reassembled application-layer communications 32 to application identification module 32 for initial processing.

Stateful inspection engine 28 stores attack definitions 33 received from security management module 44. Attack definitions 33 may be stored, for example, in a computer-readable medium, such as random access memory (RAM). Each of attack definitions 33 specifies a combination of one or more patterns specified within patterns table 54 and one or more protocol-specific anomalies specified within anomalies table 56.

When stateful inspection engine 28 receives a packet as part of a packet flow, reassembly module 50 buffers the packet in data buffer 55. In one embodiment, data buffer 55 may store data as a sliding window. That is, data buffer 55 may store data until becoming full or reaching a specified required amount of minimum data for identification. When full, data buffer 55 discards certain data to make room for storing new data. In one embodiment, data buffer 55 may store and discard data according to a first-in, first-out (FIFO)-like protocol wherein the first data to be stored is the first data to be discarded when data buffer 55 becomes full. In another embodiment, data buffer 55 may discard data according to a least recently used protocol wherein, when data buffer 55 is full, the packet flow which has been least recently used will be discarded to make room for new data to be stored.

In one embodiment, reassembly module 50 may associate packets in a packet flow, and packet flows as a communication session, according to the 5-tuple {source IP address, destination IP address, protocol, source port, destination port}. Other embodiments may use other forms of associating packets. For example, in one embodiment, IDS 20 may be part of a network that utilizes virtual local area networks (VLANs). Accordingly, reassembly module 50 may associate packets in a packet flow according to a VLAN identifier, a source address, and a destination address. In any case, reassembly module 50 may utilize the information maintained within flow table 35 (FIG. 2) to reassemble network data, e.g., to form reassembled TCP data.

Application identification module 51 initially processes application-layer communications 32 to identify the type of application and underlying protocol for each intercepted communication session. More specifically, application identification module 51 analyzes the reassembled application data for the packet flow to identify the type of application and protocol associated with the packet flow. Application identification module 51 outputs an application identifier 57 as an indicator of the identified application. For example, application identification module 51 may output an application identifier of "HTTP" to indicate that the packet flow originated from a single application-layer software application. Moreover, application identification module 51 also determines whether the application-layer data contains tunneled application-layer data. That is, application identification module 51 determines whether the packet flow originated from a plurality of stacked L7 software applications, i.e., where one L7 software application is using one or more other L7 software applications as a data transport. In this case, application identification module 51 outputs an application identifier 57 that carries application tunnel information for use in subsequent selection of multiple decoders. For example, application identification module 51 may output an application identifier of "HTTP_YAHOO_MSG" to indicate that the packet flow originated from the Yahoo Messenger application-layer software application utilizing the HTTP application as a data transport.

Decoder selection module 53 dynamically selects one or more protocol decoders 30 for application to given packet flow or individual packet of the packet flow based on the application identifier 57. In the case where the application identifier 57 specified tunneling information specifying one or more applications encapsulated within other L7 applications, decoder selection module 53 may layer multiple decoders to construct a stack of protocol decoders. In operation, the "lowest" one of the stacked protocol decoders is applied to process a packet of the application layer communications 32 and extract any further application data encapsulated within the packets payload, i.e., second application-layer data for the packet. This second application-layer data is than passed up the stacked protocol decoders to a second protocol decoder, which in turn extracts any further encapsulated application-layer data (i.e., third application-layer date) that may be tunneled within the second application-layer data. This process continues up the stack of protocol decoders until the innermost application-layer data of the packet has been extracted. All or a portion of the extracted application-layer data (that is, application-layer data extracted at any level of the protocol decoder stack) may then be decoded to output transaction data 34, application-layer elements 36 and protocol anomaly data 38 to stateful inspection engine 28.

To aid in application identification and selection of protocol decoders 30, application identification data 68 may include a hierarchically ordered list of applications, such as application tree 70, that is organized to represent known L7 applications that may originate packet flows. Stateful inspection engine 28 may maintain application identification data as a tree structure in a computer-readable medium. Security management module 44 may provide administrator 42 with a user interface to modify the contents and hierarchy of the list. Upon receiving a packet flow which may belong to one of several similar applications, application identification module 51 may determine the most likely candidate application. As application identification module 51 receives more information about the packet flow, application identification module 51 may alter the original determination accordingly. For example, application identification module 51 may initially determine that a packet flow is an HTTP session. After obtaining more information from the packet flow, however, application identification module 51 may determine that the packet flow actually corresponds to an instance of Kazaa over HTTP, rather than a pure HTTP communication session. The use and structure of application tree 70 are discussed in greater detail with respect to FIG. 4. Application identification module 51 may specify the plurality of decoders 30 that are to be stacked for decoding application-layer data of a tunneled packet flow that was produced by various layered applications and protocols.

In one embodiment, stateful inspection engine 28 may instantiate multiple application identification modules that work together in sequence or in parallel to attempt to identify one or more applications associated with a particular communication session. For example, an array of application identification modules may operate in parallel, each application identification module applying a different set of signatures, to attempt to identify the application(s) associated with a particular communication session. Moreover, other embodiments may use arrays of other modules. For example, one embodiment may utilize an array of attack identification modules.

In some embodiments, multiple layer 7 applications may independently utilize the same communication stream. For example, Kazaa, YMSG, and a traditional HTTP application, such as a web browser, may all utilize the same HTTP data stream as a data transport. Accordingly, in some embodiments, IDS 20 may use application identification module 51 to continually apply application signatures from application tree 70 to a communication stream to determine transitions from one L7 application to another (e.g., a transition from Kazaa to YMSG) for the same L7 transport (e.g., HTTP) of the same packet flow. In this case, decoder selection module 53 dynamically reconstructs the stack of protocol decoders 30 to be applied to the packets of that packet flow. In some embodiments, IDS 20 may partition each communication stream into a sequence of data blocks, i.e., "chunks," and reconstructs the stack of protocol decoders, if necessary, upon processing each chunk. For example, it may only take 400 bytes of data at maximum to either make a determination of the identity of an application or to determine that the application identity cannot be determined. Consequently, IDS 20 may utilize delimiters 400 bytes apart within the data stream to segment the data stream into 400 byte chunks; once a delimiter for a particular chunk is reached, application identification module 51 may start the attempt to determine the identity of the application associated with the next 400 byte chunk of data. In one embodiment the 400 byte buffer is a tunable limit set by an administrator or script.

In some cases, application identification module 51 may not be able to identify the application. Various embodiments may treat this situation according to specifications of, for example, a system administrator, such as administrator 42, or according to a default action. For example, in one embodiment, IDS 20 simply forwards packet flows with undetermined application types and protocols that cannot be determined, as an unknown application may indicate that the packet flow is not targeting any type of application known to pose a security threat. In other embodiments, IDS 20 may automatically discard packet flows with unknown application types and protocols that cannot be determined.

In one embodiment, a co-processor may perform the functions of application identification module 51. That is, a co-processor dedicated to the task of determining the identity of an application may perform the functionality of application identification module 51. A primary processor of IDS 20 may off-load the responsibility for identifying applications associated with a packet flow to the application identification co-processor. The co-processor may share one or more computer readable media with a primary processor. For example, the shared computer-readable medium may include instructions for each processor to cause each processor to perform the associated tasks. The medium may be a computer-readable storage medium, such as random access memory (RAM), dynamic RAM (DRAM), static RAM (SRAM), read only memory (ROM), programmable ROM (PROM), erasable PROM (EPROM), electrically erasable PROM (EEPROM), flash memory, or any other suitable computer-readable media. Such computer-readable media may also be used in various embodiments to store instructions to cause one or more programmable processors to perform the functions described herein.

After application identification and decoding, attack detection module 52 applies attack definitions 33 to application-layer elements 36 and protocol anomaly data 38 received from protocol decoders 30 to detect an attack or other malicious activity. In particular, for each of attack definitions 33, attack detection module 52 selects the one or more patterns within patterns table 52 specified by the attack definition and determines whether any of application-layer elements 36 match the defined patterns. Each of the patterns may be defined as a respective "regular expression," which generally refers to a formula that is used to match patterns within data.

In addition to determining whether the defined patterns are present, attack detection module 52 may determine whether any protocol anomalies detected by protocol decoders 30 match the protocol anomalies specified by attack definitions 33. Attack detection module 52 determines that the corresponding packet flow matches one of attack definitions 33 when both the patterns and protocol anomalies specified by the attack definition are detected within a given communication session. Further, each of attack definitions 33 may specify whether the pattern matching and protocol anomalies must be satisfied on a per-transaction basis or over the lifetime of the communication session.

In the event a security risk is detected, stateful inspection engine 28 outputs alert 40 to security management module 44 (FIG. 2) for logging and further analysis. Stateful inspection engine 28 may also direct forwarding component 31 to automatically drop the packet flow associated with the application-layer communications within which the network attack was detected. In this manner, stateful inspection engine 28 combines pattern matching with protocol-specific anomaly analysis to detect sophisticated attack behaviors.

Figure 4:
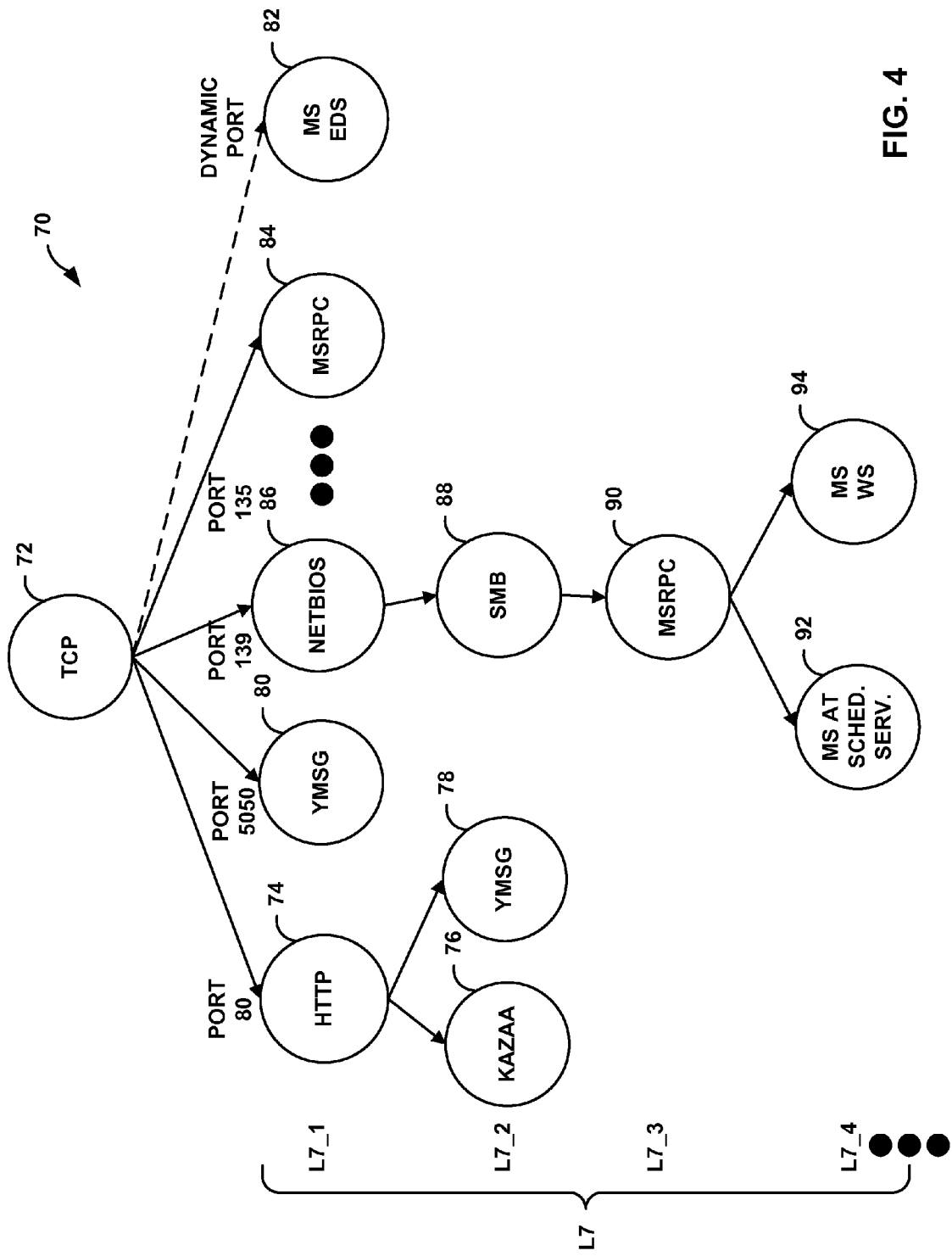
FIG. 4 is a block diagram illustrating an example embodiment of an application tree.

FIG. 4 is a block diagram illustrating an example embodiment of a portion of application tree 70 that may be used to logically represent operation of IDS 20 in identifying packet flows produced by layered L7 software applications. In other words, IDS 20 may utilize application tree 70 as a basis for expanding the concept of the transport layer to the application level of the network stack so as to identify packet flows originating from stacked software applications and communication protocols.

For example, certain applications or protocols, such as HTTP, are typically bound to a static port assignment, such as port 80. Other applications, such as the Microsoft Exchange Directory Service (MS EDS) may obtain a dynamic port assignment. Still other applications may utilize a particular application as a transport; for example, Kazaa may operate over an HTTP data stream. An IDS, such as IDS 20, may use application identification module 51 to consult application tree 70 to identify various types of applications that may be encapsulated within other applications (i.e., using other applications to provide an L7 transport). For example, application identification module 51 may use application tree 70 to identify an application that uses a static port binding, an application that uses a dynamic port binding, and an application that uses another application or multi-layered application as a transport application. Consequently, layer seven (L7) of the Open Systems Interconnection (OSI) networking model, or the application layer, can itself be considered to be logically divided into N sub-layers. Although the example of FIG. 4 illustrates L7 as being divided into four sub-layers (L7_1 through L7_4), the techniques described herein may support any number (N) of sub-layers of L7, i.e. L7_1-L7_N.

In some situations, a tunneled application has a specific encapsulation signature (i.e., a signature that is very specific to the protocol that it uses for a transport protocol. In these situations, application tree 70 may easily be used to identify the one or more tunneled applications.

In other situations, the underlying L7 transport protocol may provide an almost opaque field within which the second application's data is carried. In this case, the signatures for the underlying L7 transport protocol and the encapsulated L7 protocol are nearly identical. In this case, application identification module 51 may also apply a set of generic signatures for encapsulation of application data in a raw format within data fields provided by another L2 protocol. For example, application identification module 51 may first identify the underlying L7 transport protocol, and then apply one or more of the generic signatures to the payload of the communication to attempt to determine that the payload carries encapsulated data for one or more different L7 applications. For example, application identification module 51 may first identify that a data stream is associated with HTTP, and may then apply the generic signatures to the payload of the HTTP communication to determine whether the HTTP communication is carrying data associated with another L7 application.

Each node of application tree 70 may include a name of an application and an associated signature that application identification module 51 may use for detecting the application. The example application tree 70 of FIG. 4 includes a variety of applications. Application tree 70 includes HTTP node 74. HTTP typically operates over TCP port 80, thus application tree 70 includes HTTP node 74 and an indication that the particular signature of HTTP node 74 is associated with port 80. Other embodiments may include additional HTTP nodes for other ports. For example, HTTP may also operate over ports 81, 82, 8080, and 8090, therefore other embodiments may include signatures for recognizing HTTP over these or other ports as well.

Certain applications, such as Kazaa and Yahoo Messenger (YMSG) may operate over HTTP, e.g., using HTTP to transport data for the application. Application tree 70, therefore, includes Kazaa node 76 and YMSG node 78 as child nodes of HTTP node 74. Application identification module 51 may determine that the signature of Kazaa node 76 is used for identifying Kazaa over HTTP due to the location of Kazaa node 76 in application tree 70. Likewise, application identification module 51 may determine the signature of YMSG node 78 is used for identifying YMSG over HTTP. During operation, application identification module 51 may first determine, using the signature associated with HTTP node 74, that a packet flow is associated with HTTP. Application identification module 51 may then apply the signatures associated with Kazaa node 76 and YMSG node 78, in turn, to determine whether a packet flow or an individual packet is associated with either Kazaa or YMSG in addition to HTTP.

Certain applications, like YMSG, may operate either over another application, such as HTTP, or may operate independently over L4, e.g. TCP. Application tree 70 therefore includes an additional YMSG node 80 for detecting YMSG over port 5050. Application identification module 51 may use the signature of YMSG node 80 to identify YMSG operating over TCP port 5050. Thus, application identification module 51 may identify YMSG both when YMSG is operating over HTTP, using YMSG node 78, and when YMSG is operating over TCP port 5050 using YMSG node 80.

Furthermore, some applications may operate over a stack of multiple underlying applications or protocols. For example, Microsoft AT-Scheduler Service (MS AT Sched. Serv.) and Microsoft Workstation Service (MS WS) may operate over the Microsoft Remote Procedure Calls (MSRPC). MSPRC may itself operate over Microsoft Server Message Block (SMB), which itself may operate over the network basic input output system (NetBIOS) operating over TCP port 139. Application tree 70 thus includes NetBIOS node 86, which includes a signature for identifying an instance of NetBIOS operating over TCP port 139. Likewise, application tree 70 includes SMB node 88 for identifying an SMB session over NetBIOS over TCP port 139. Application tree 70 also includes MSRPC node 90 for identifying MSRPC over SMB over NetBIOS over TCP port 139. Moreover, application tree 70 includes MS AT Sched. Serv. node 92 and MS WS node 94 for identifying, respectively, MS AT Sched. Serv. and MS WS, each over MSRPC over SMB over Net-BIOS over TCP port 139.

Applications such as MSRPC need not necessarily operate over another application. That is, MSRPC may operate directly over, for example, TCP port 135. Application tree 70 thus also includes MSRPC node 84 for identifying MSRPC over TCP port 135. Consequently, application identification module 51 may identify MSRPC both when MSRPC is operating over TCP port 135 and when MSRPC is operating over SMB over NetBIOS over TCP port 139.

Some applications, such as MS EDS, obtain a TCP port dynamically. Peer-to-peer programs also tend to obtain dynamic port numberings. Therefore, an application tree may include signatures used for identifying applications that utilize dynamic port determinations. For example, application tree 70 includes MS EDS node 82, which application identification module 51 may use to identify an MS EDS instance. More details with respect to identifying applications that utilize a dynamic port assignment are discussed in co-pending application "IDENTIFYING APPLICATIONS FOR INTRUSION DETECTION SYSTEMS," U.S. patent application Ser. No. 11/835,923, filed Aug. 8, 2007, to Burns et al., which is incorporated herein by reference in its entirety.

IDS 20 may implement application tree 70 in a variety of different ways. For example, IDS 20 may implement application tree 70 as a tree structure, as shown in the example of FIG. 4. However, IDS 20 may implement application tree 70 in a variety of different data structures as well. For example, IDS 20 may implement application tree 70 as one or more arrays, linked lists, doubly-linked lists, tables, databases, radix trees, binary search trees, flat files, or any other data structures. In addition, the logical operation represented by application tree 70 may be coded within state machines or other control logic for of IDS 20 so that a separate data structure may not be required.

Although the example of FIG. 4 focuses on protocols operating over TCP, other embodiments or portions of application tree 70 may include other transmission layer protocols instead of, or in addition to, TCP node 72. For example, an alternative embodiment of application tree 70 may include a UDP node in addition to TCP node 72. Moreover, other embodiments may include other signatures for identifying other applications or more situations of the same application. For example, another embodiment may include signatures for identifying America Online® Instant Messenger (AIM®).

Application tree 70 may provide a degree of flexibility and scalability to IDS 20. For example, IDS 20 may create and/or update application tree 70 during operation of IDS 20. For example, administrator 42 may create or update application tree 70 through security management module 40 of IDS 20. Administrator 42 may first create application tree 70 of IDS 20 by programming IDS 20 or loading data. For example, administrator 42 may retrieve application tree 70 from a disk, a network drive, the Internet, flash memory, or other data location. In some implementations, IDS 20 may create and/or update application tree 70 during operation of IDS 20. For example, IDS 20 may automatically retrieve new signatures and/or new nodes of application tree 70, and may automatically update existing nodes of application tree 70.

To detect the identity of an application, application identification module 51 may traverse the interrelated nodes of application tree 70. To traverse application tree 70, application identification module 51 may use, for example, a depth-first search algorithm and may further prune particular branches of application tree 70 according to information gathered from the communication stream. Application identification module 51 may use certain information to assist in the identity detection. For example, IDS 20 may include a static port binding table to assist in determining the identity of applications associated with particular port numbers, such as particular TCP port numbers. The static port binding table may include, for example, an entry associating HTTP with TCP port 80.

As an example operation, application identification module 51 may first determine that a packet flow is present over TCP port 80. Application identification module 51 may then attempt to identify the application associated with the packet flow. Application identification module 51 may first apply the signature from HTTP node 74 to the packet flow. If the signature indicates a match, IDS 20 may determine whether other applications are also associated with the communication session. For example, application identification module may retrieve signatures from the child nodes of HTTP node 74, e.g. Kazaa node 76 and YMSG node 78. If either signature matches, application identification module 51 may continue to traverse the tree. If a signature fails, application identification module 51 may determine that the child nodes of the node from which the signature was obtained are not possible applications, therefore application identification module 51 may retrieve a signature from a sibling node and apply the sibling signature to the packet flow. When sibling nodes have been exhausted without a match, application identification module 51 may conclude that the application of the parent node is the application associated with the packet flow.

In one embodiment, application identification module 51 may include a set of generic signatures to assist in identifying the application associated with the packet flow when there is no branch of application tree 70 corresponding to the application associated with the packet flow. For example, IDS 20 may receive a packet flow that includes a request for data from an Oracle database that is packaged in an HTTP communication. In the example of FIG. 4, there is no node of application tree 70 that corresponds to a request for data from an Oracle database, although there is a node corresponding to an HTTP communcation (i.e., HTTP node 74). In this example, application identification module 51 may traverse application tree 70 and reach HTTP node 74. Application identification module 51 may then recognize that the children nodes of HTTP node 74 (i.e. Kazaa node 76 and YMSG node 78) do not match the packet flow. In such a case, application identification module 51 may identify the payload of the HTTP communication and apply one or more of the set of generic signatures to the payload of the HTTP communication.

Once application identification module 51 has determined the identity of the application associated with the packet flow, the application identification module outputs an application identifier 57 to represent the specific arrangements of the applications within the tunneled packet flow. For example, application identification module 55 may produce an application identification 55 of "NETBIO_SMB_MSRPC_MSWS" for a positive identification of a packet flow in accordance with signature specified by node 94. Protocol decoder selection modules may then construct a protocol decoder stack in this order so as to extract the tunneled application-layer data for each of these protocols for use in attack detection. IDS 20 may then use attack detection module 52 to determine whether the packet flow represents a network attack. That is, attack detection module 52 may also select attack signatures based on the application identification 55 provided by application identification module 51.

In this way, IDS 20 may be able to determine the identity of a variety of different applications, even when one or more applications are using another L7 application or protocol as a transport, in order to detect or prevent network intrusions. For example, IDS 20 may be able to determine the identity of traditional applications that are associated with a static port, as well as applications that obtain a port assignment dynamically and applications that use other applications as a transport means. By determining the identity of such a wide range of applications, IDS 20 may be able to better determine whether a particular communication session represents a network attack.

Figure 5:
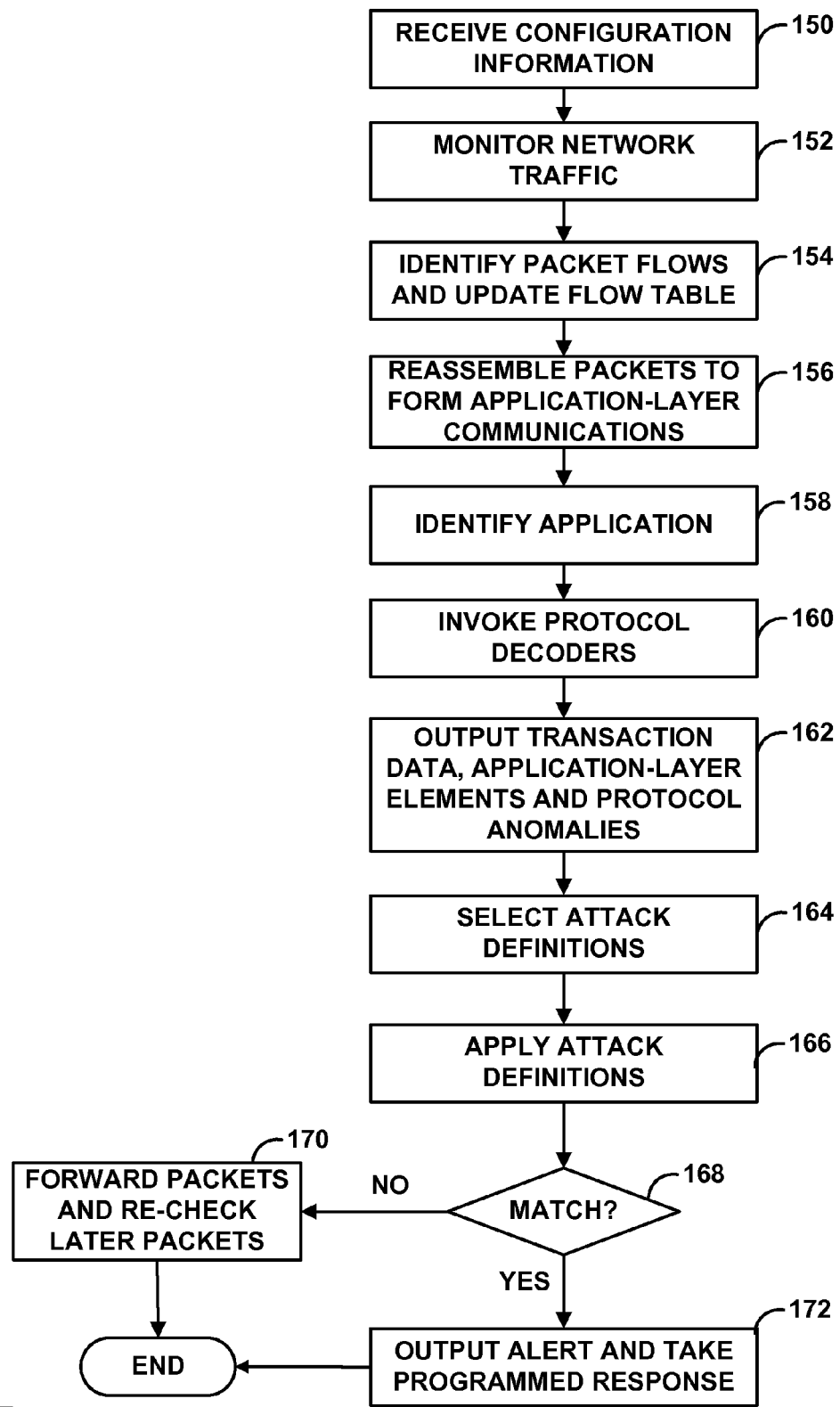
FIG. 5 is a flowchart illustrating exemplary operation of an IDS in accordance with the principles of the invention.

FIG. 5 is a flowchart illustrating exemplary operation of IDS in accordance with the principles of the invention. For exemplary purposes, the flowchart is described in reference to IDS 20 (FIG. 2).

Initially, security management module 44 receives configuration information from administrator 42 and, in response, configures IDS 20 to monitor a network or portions thereof (subnets) of interest (150). During this process, security management module 44 may present a user interface by which administrator 42 specifies patterns or other attack definitions 33. Moreover, security management module 44 may present a user interface by which administrator 42 may produce, retrieve, load, or configure application tree 70 so as to expand the IDS to address situations where the application layer is used as a form of a transport layer.

Once configured, IDS 20 monitors network traffic 24 (152). In some configurations, stateful inspection engine 28 of forwarding plane 22 may receive network traffic and mirror the network traffic for purposes of analysis. Forwarding component 31 seamlessly forwards the original network traffic. In other embodiments, traffic is not mirrored, rather a line-rate buffering approach is used to analyze the traffic in real-time prior to forwarding.

Flow analysis module 25 analyzes the network traffic to identify packet flows and updates flow table 35 to describe each active flow present within the network traffic (154). Stateful inspection engine 28 buffers each flow in data buffer 55, and reassembles the packet flow into transmission control protocol (TCP) data (156). Stateful inspection engine 28 may wait until a sufficient, minimum amount of data is present before proceeding to application identification. As packets may arrive out of order, reassembly module 50 may wait until enough data have arrived to determine the beginning of the packet flow before performing analysis on the packet flow.

After identifying the beginning of the packet flow, application identification module 51 makes a preliminary determination of the type of application and protocol of the packet flow and outputs application identification 55 (158). This preliminary determination may be based on the pattern of the received packet flow, initial inspection of the payloads of the packets of the packet flow, the amount of data received in the packet flow or other characteristics. At this time, application identification module 51 may traverse application tree 70 to determine the identity of the application (or layered applications) that likely originated the packet flow. Protocol decoder selection module 53 then selects and invokes the appropriate protocol decoders 30 to analyze the application-layer communications 32 based on the application and protocol determination (160). That is, protocol decoders 30 analyze reassembled application-layer communications 32. In one embodiment, protocol decoder selection module 53 may select a generic protocol decoder when protocol decoder selection module 53 does not find a protocol decoder directly corresponding to the application-layer communication 32. The selected protocol decoder of protocol decoders 30 may then communicate transaction data 34, application-layer elements 36 and protocol anomaly data 38 to stateful inspection engine 28 (162).

As described above, during this process, multiple application decoders may be applied in the event it is determined that an application-layer software application is being used as a transport for another application. In this case, a first decoder for the outer application is applied to decode its payload, and a second decoder for the encapsulated application is applied to the application-layer data transported by the underlying application. For example, a first decoder for HTTP application-layer data may be applied to the TCP stream followed by a second decoder specified for Yahoo Messenger application data transported by the HTTP protocol. In another example, three or more application layer decoders may be applied to identify the underlying transaction data 34, application-layer elements and protocol anomaly data 38. This layered approach allows application protocol decoders to easily be re-used and applied to the same TCP/UDP port.

Upon receiving data from protocol decoders 30, stateful inspection engine 28 selects the attack definitions 33 that are defined for the corresponding protocol, and optionally a set of default attack definitions when no particular type of application has been identified (164). In the event multiple protocol decoders were applied so as to extract encapsulated application-layer data that was transported using one or more other applications, stateful inspection engine 28 applies the attack definitions defined for the most recently applied decoder (i.e., the inner-most type of application within the layered encapsulation). Alternatively, stateful inspection engine 28 may apply an attack definition that is specifically defined for a certain application encapsulations sequence (e.g., Yahoo! Messenger encapsulated within HTTP). This type of attack definition may examine data related to both the outer application (e.g., HTTP) and the inner application(s) (e.g., Yahoo Messenger via HTTP) in order to identify certain attack signatures.

In either case, stateful inspection engine 28 then applies the selected attack definitions to determine whether the communication session represents a security risk (166). When applying a given attack definition, stateful inspection engine 28 determines whether all of the specified patterns and protocol anomalies are satisfied for any given communication session between peers, either on a per-transaction basis or over the lifetime of the communication session, as specified by the attack definition. Moreover, if required by the attack definition, stateful inspection engine 28 may determine whether the specified patterns and protocol anomalies are satisfied in a required order.

In the event a security risk (i.e., match) is detected (168), stateful inspection engine 28 outputs alert 40 to security management module 44 for logging and further analysis (172). In addition, stateful inspection engine 28 may take any of a number of programmed responses, such as dropping the packets associated with the communication session, automatically closing the communication session or other action. If no security risk is detected for a given application-layer communication session, forwarding component 31 forwards the packet flow to the destination (170). IDS 20 then waits for a response packet flow and reanalyzes the packet flow in light of the response to check the initial determination.

Figure 6:
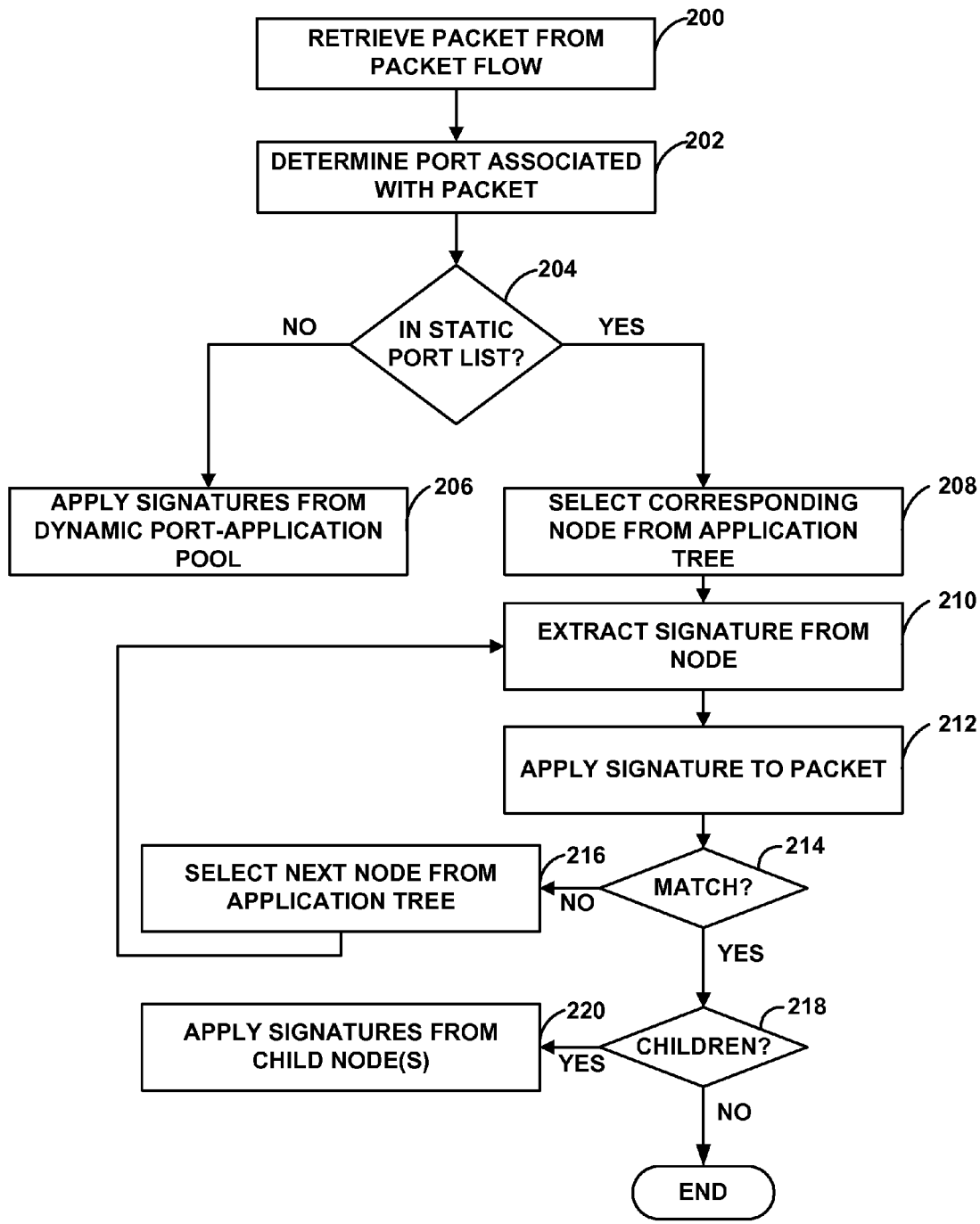
FIG. 6 is a flow chart illustrating an example process for identifying an application.

FIG. 6 is a flow chart illustrating an example process for identifying an application. FIG. 6 describes an exemplary sequence of events for performing step 158 of FIG. 5 in further detail. Initially, application identification module 51 retrieves one or more packets from a packet flow for which application identification is desired (200). Application identification module 51 may then extract a port number associated with the packet (202). For example, application identification module 51 may extract port number "80" from the packet. Other embodiments may employ other methods for determining a starting node, e.g. by applying one or more default signatures or analyzing the packet for characteristics of certain applications.

Application identification module 51 may then determine whether the extracted port number is associated with a static port binding (204). For example, if the port number is "3856," application identification module 51 may determine that the packet is associated with an application that utilizes a dynamic port assignment ("NO" branch of 204), as port number "3856" is not commonly associated with any particular, commonly used network application. Therefore, application identification module 51 may apply signatures associated with applications that utilize dynamic port assignments to the packet.

On the other hand, if the port number is a port number that is commonly associated with a particular application, such as port number "80," application identification module 51 may determine that the packet is associated with a static port assignment application ("YES" branch of 204). In this case, application identification module 51 may select one or more nodes from application tree 70 corresponding to the port number (206). In the case of port number "80," application identification module 51 will select the node corresponding to "HTTP," e.g. HTTP node 74 of FIG. 4. In some cases, multiple common programs may use the same port number. For example, e-mail clients such as Mozilla Thunderbird and Microsoft Outlook, as well as Internet Relay Chat (IRC) clients, each commonly use port number 113 for identifying the username/account ID associated with a particular communication. In such a case, application identification module 51 may prune application tree 70 such that relevant applications may be analyzed without necessarily needing to analyze irrelevant applications. Moreover, application identification module 51 may apply other application signatures not corresponding to the port number when an identification is not made after the following steps.

After application identification module 51 selects a node from application tree 70, application identification module 51 may extract an application signature from the selected node (208). For example, HTTP node 74 of application tree 70 includes an HTTP signature. Likewise, Kazaa node 76 of application tree 70 includes a Kazaa HTTP signature, while YMSG node 78 of application tree 70 includes an YMSG HTTP signature. When application identification module 51 selects HTTP node 74, application identification module 51 may extract the HTTP signature from HTTP node 74. In one embodiment, if application identification module 51 determines that no node of application tree 70 corresponds to the packet, application identification module 51 may select a set of generic signatures to apply to the payload of a higher-order protocol.

Application identification module 51 may then apply the signature to the packet (212) to determine whether there is a match (214). For example, the signature may be a pattern; application identification module 51 may determine a match exists when the packet fits the pattern. If the signature does not match the selected application ("NO" branch of 214), application identification module 51 may select a sibling node from application tree 70 (216) and determine whether the packet matches the sibling node. In one embodiment, application identification module 51 may use a first decoder to apply the signature of the first node and a second decoder to apply the signature of the sibling node. When there are no remaining siblings, application identification module 51 may return to the parent node and determine that the application of the parent node is the application associated with the packet.

If the signature applied to the packet returns a match ("YES" branch of 214), application identification module 51 may determine that the packet relates to the selected node. For example, application identification module 51 may determine that a packet that matches an HTTP signature relates to HTTP. However, such a packet may also relate to Kazaa over HTTP or YMSG over HTTP, as examples. Therefore, application identification module 51 determines whether the node has child nodes (218).

If the node does not have any child nodes ("NO" branch of 218), application identification module 51 may determine that the best-fit application has been determined for applying attack signatures 33, and may end by outputting the appropriate application identification 55. If the node does have child nodes ("YES" branch of 218), however, application identification module 51 may select a child node from application tree 70 (220) and apply the signature associated with the child node. Step 220 is essentially a recursive call of the procedure for determining whether the child node signatures match the packet flow. As discussed above, if none of the application signatures associated with the child nodes matches the packet flow, application identification module 51 will return to the parent that matched and determine that the application of the parent node is the application associated with the packet. Then, as discussed above with respect to FIG. 5, stateful inspection engine 28 may proceed to apply the appropriate protocol decoders and determine whether the packet flow represents an attack.

Although discussed primarily with respect to an intrusion detection system (IDS), the techniques described herein are not limited to IDSs and may be used in other contexts. For example, the techniques described herein may be applied to an intrusion prevention system (IPS). The techniques described herein may also be applied to monitoring the use of particular applications or services. Similarly, the techniques described herein may be applied to providing Quality of Service over a network. Likewise, the techniques described herein may be applied to charging a fee based on the use of particular services or applications.

Various embodiments of the invention have been described. These and other embodiments are within the scope of the following claims.

The invention claimed is:
1. A method comprising:
processing a packet flow with a network device to identify a first application-layer communication protocol associated with the packet flow and a second application-layer communication protocol that is using the first application-layer communication protocol as a data transport within the packet flow, wherein each of the first application-layer communication protocol and the second application-layer communication protocol comprises an independent application-layer communication protocol;
after identification of the first application-layer communication protocol and the second application-layer com- munication protocol, dynamically constructing, based on the identification, a stack comprising an ordered arrangement of two or more application-layer decoders, each of the application-layer decoders configured to extract application-layer data from packet data conforming to a respective communication protocol;

applying, with the network device, the stack of the application-layer decoders to the packet flow in accordance with the ordered arrangement to extract first application-layer data for the first application-layer communication protocol and to extract second application-layer data that is encapsulated within the first application-layer data in accordance with the second application-layer communication protocol;

inspecting, with the network device, the second application-layer data; and executing a programmed action with the network device in response to the inspection of the second application-layer data.

2. The method of claim 1, wherein executing a programmed action comprises dropping packets of the packet flow.

3. The method of claim 1, wherein inspecting the second application-layer data comprises applying one or more attack definitions to the second application-layer data with the network device to detect a network attack.

4. The method of claim 1, wherein inspecting the second application-layer data comprises analyzing the second application-layer data to identify any protocol anomalies with the second application-layer communication protocol.

5. The method of claim 1, wherein inspecting the second application-layer data comprises applying one or more patterns to the second application-layer data with the network device.

6. The method of claim 1, wherein inspecting the second application-layer data comprises applying one or more signatures to the second application-layer data with the network device.

7. The method of claim 1, wherein processing the packet flow comprises:
accessing a hierarchical data structure to select one or more signatures of application-layer communication protocols that use other application-layer software applications as a data transport;
applying the signatures to the packet flow to identify the first application-layer communication protocol and the second application-layer communication protocol.

8. The method of claim 1, further comprising:
inspecting, with the network device, the first application-layer data; and
executing a programmed action in response to inspecting the first application-layer protocol.

9. The method of claim 1, wherein each of the application-layer decoders receives generic transport layer output as input instead of only TCP/UDP stream output so that any output from one of the application-layer decoders can be seamlessly used as input to another one of the application-layer decoders.

10. The method of claim 1, further comprising:
partitioning the packet flow into chunks,
buffering the plurality of chunks; and
identifying an application associated with a plurality of the chunks.

11. The method of claim 1, further comprising, after receiving the packet flow and processing the packet flow with lower-levels of a network stack, passing the packet flow to an application-layer of the network stack by a universal interface that is independent from a type of data transport associated with the lower levels such that the universal interface receives the packet flow as pure application layer data, and
wherein the application-layer of the network stack comprises the stack of application-layer decoders.

12. The method of claim 1, wherein applying the stack of the application layer-decoders to the packet flow comprises:
applying a first application-layer decoder of the stack of the application-layer decoders to the packet flow to process the first application-layer data for the first application-layer communication protocol and extract the second application-layer data encapsulated within the first application-layer data; and
applying a second application-layer decoder of the stack of the application-layer decoders to the extracted second application-layer data to process the second application-layer data for the identified second type of application-layer communication protocol.

13. The method of claim 1, wherein the first application-layer communication protocol comprises one of a HyperText Transfer Protocol (HTTP), a Server Message Block (SMB) protocol, or a network basic input output system (NETBIOS) protocol.

14. The method of claim 1, further comprising:
processing the packet flow to identify a third application-layer communication protocol that is using the second application-layer communication protocol as a data transport within the packet flow;
applying one or more application-layer decoders to process the second application-layer data for the second application-layer communication protocol and extract third application-layer data encapsulated within the second application-layer data in accordance with the third application-layer communication protocol;
inspecting the third application-layer data; and
executing a programmed action with the network device in response to the inspection of the third application-layer data.

15. The method of claim 1, further comprising:
receiving, with the network device, a second packet flow within the network, wherein the second packet flow uses a single type of application-layer communication protocol;
performing an initial analysis of the second packet flow to identify an application-layer communication protocol associated with the second packet flow;
applying a single application-layer decoder to the second packet flow to process application-layer data for the application-layer communication protocol identified for the second packet flow;
inspecting the application-layer data extracted from the second packet flow; and
executing a programmed action with the network device in response to the inspection of the application-layer data extracted from the second packet flow.

16. The method of claim 1, wherein dynamically constructing the stack comprises:
constructing the stack to include a first decoder that is associated with the first application-layer communication protocol and a second decoder associated with the second application-layer communication protocol; and
arranging the first decoder and the second decoder within the stack so that the first decoder processes packets from the packet flow to extract the first application-layer data and so that the first application-layer data output by the first decoder is provided as input packet data to the second decoder for the second application-layer communication protocol.

17. The method of claim 1, further comprising dynamically reconstructing the stack of protocol decoders in response to detecting a transition with the packet flow to a different application-layer communication protocol.

18. The method of claim 1, further comprising:
presenting an interface to receive configuration data defining a hierarchical ordering of application-layer communications protocols that utilize other application-layer communications protocols for transport; and
dynamically constructing the stack of application-layer decoders in accordance with the hierarchical ordering specified in configuration data.

19. The method of claim 18, comprising modifying the hierarchical ordering of the application-layer communication protocols within the configuration data in response to input.

20. A network firewall comprising:
a plurality of application-layer decoders, each of the application-layer decoder configured to extract application-layer data from packet data conforming to a respective communication protocol;
a network interface to receive a packet flow;
an application identification module to process the packet flow to identify a first application-layer communication protocol associated with the packet flow and a second application-layer communication protocol that is using the first application-layer communication protocol as a data transport within the packet flow, wherein each of the first type of application-layer communication protocol and the second type of application-layer communication protocol comprises an independent application-layer communication protocol;
a decoder selection module to dynamically construct, based on identification of the first application-layer communication protocol and the second application-layer communication protocol, a stack comprising an ordered arrangement of two or more of the application-layer decoders, wherein decoder selection module arranges the stack of application-layer decoders to extract first application-layer data for the first application-layer communication protocol within the packet flow and extract second application-layer data that is encapsulated within the first application-layer data in accordance with the second application-layer communication protocol;
a stateful inspection engine to inspect the second application-layer data; and
a forwarding component to execute an action in response to the inspection of the second application-layer data.

21. The network firewall of claim 20, wherein the forwarding component is configured to drop the packets of the packet flow in response to identification of a security risk by the stateful inspection engine.

22. The network firewall of claim 20, wherein the stateful inspection engine is configured to applying one or more attack definitions to the second application-layer data to detect a network attack.

23. The intrusion detection system of claim 22, wherein the stateful inspection engine is configured to select the one or more attack definitions in accordance with identification of the second application-layer communication protocol by the application identification module.

24. The network firewall of claim 20, wherein the stateful inspection engine is configured to analyze the second application-layer data to identify any protocol anomalies in accordance with identification of the second application-layer communication protocol by the application identification module.

25. The network firewall of claim 20, wherein the stateful inspection engine is configured to select an apply signatures to the second application-layer data in accordance with identification of the second application-layer communication protocol by the application identification module.

26. The intrusion detection system of claim 20, wherein each of the application-layer decoders includes a common, universal interface to receive input data that allows the application-layer decoders to be layered for application as the stack of decoders, wherein the universal interface is configured to receive input data without regard to a transport protocol for the data within the packet flow.

27. The network firewall of claim 20, wherein each of the application-layer decoders receives generic transport layer data as input so that any output from one of the application-layer decoders can be seamlessly used as input to another one of the application-layer decoders.

28. The network firewall of claim 20,
wherein the stateful inspection engine is configured to inspect the first application-layer data, and
wherein the forwarding component is configured to execute an action in response to the inspection of the first application-layer data.

29. The network firewall of claim 20, wherein the second application-layer communication protocol that is using the first application-layer communication protocol as a data transport comprises a layer seven (L7) messaging communication protocol that is using the HyperText Transfer Protocol (HTTP) as the data transport.

30. The network firewall of claim 20, further comprising a security management module that presents a user interface to receive configuration data defining a hierarchical ordering of application-layer communications protocols that utilize other application-layer communications protocols for transport,
wherein the decoder selection module dynamically constructs the stack of application-layer decoders in accordance with the hierarchical ordering specified in configuration data.

31. The network firewall of claim 20,
wherein the application identification module outputs an application identifier that identifies both the first application-layer communication protocol and the second application communication protocol,
wherein the application identifier includes application tunnel information for subsequent selection of the two or more decoders, the application tunnel information indicating that the second application-layer communication protocol is using the first application-layer communication protocol as a transport, and
wherein the decoder selection module is responsive to the application identifier and dynamically constructs the stack of two or more application-layer decoders based on the application identifier output by the application identification module.

32. A network firewall comprising:
a plurality of application-layer decoders, each of the application-layer decoder configured to extract application-layer data from packet data conforming to a respective communication protocol;
a network interface to receive a packet flow;
an application identification module to process the packet flow to identify a first application-layer communication protocol associated with the packet flow and a second application-layer communication protocol that is using the first application-layer communication protocol as a data transport within the packet flow, wherein each of the first type of application-layer communication protocol and the second type of application-layer communication protocol comprises an independent application-layer communication protocol; and a stateful inspection engine to dynamically select, based on identification of the first application-layer communication protocol and the second application-layer communication protocol, a first decoder associated with the first application-layer communication protocol and a second decoder associated with the second application-layer communication protocol, wherein the first decoder is configured to process the packet flow to produce a first set of application-layer communications that conform to the first application-layer communication protocol, and wherein the second decoder is configured to process the first set of application-layer communications to produce a second set of application-layer communications that conform to the second application-layer communication protocol, and wherein the stateful inspection engine arranges the selected first decoder and second decoder within the stack such that the first decoder processes packets from the packet flow to extract the first application-layer data and outputs the first application-layer data as input to the second decoder.

33. The network firewall of claim 32, wherein the stateful inspection engine is configured to apply signatures to the second set of application-layer communications to inspect the second set of application-layer communications.

34. The network firewall of claim 32, wherein the stateful inspection engine is configured to apply attack definitions to the second set of application-layer communications to inspect the second set of application-layer communications.

* * * * *